United States Patent
Husslein et al.

(10) Patent No.: US 12,497,102 B2
(45) Date of Patent: Dec. 16, 2025

(54) METHOD FOR PROCESSING A MEASUREMENT SIGNAL

(71) Applicant: ZF Automotive Germany GmbH, Alfdorf (DE)

(72) Inventors: Dennis Husslein, Düsseldorf (DE); Torsten Junker, Cologne (DE); Emad Farshizadeh, Alfdorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 1212 days.

(21) Appl. No.: 17/315,311

(22) Filed: May 9, 2021

(65) Prior Publication Data

US 2021/0354752 A1    Nov. 18, 2021

(30) Foreign Application Priority Data

May 13, 2020    (DE) .......................... 102020206053.3

(51) Int. Cl.
| | |
|---|---|
| *B62D 6/10* | (2006.01) |
| *G06F 17/18* | (2006.01) |
| *G06F 18/2134* | (2023.01) |
| *H03H 17/06* | (2006.01) |

(52) U.S. Cl.
CPC ............... *B62D 6/10* (2013.01); *G06F 17/18* (2013.01); *G06F 18/21342* (2023.01); *H03H 17/06* (2013.01)

(58) Field of Classification Search
CPC ..... B62D 6/10; G06F 18/21342; G06F 17/18; H03H 17/06
See application file for complete search history.

(56) References Cited

U.S. PATENT DOCUMENTS

| | | | | |
|---|---|---|---|---|
| 6,362,760 | B2* | 3/2002 | Kober | H03M 1/121 |
| | | | | 341/61 |
| 9,015,093 | B1* | 4/2015 | Commons | G01C 21/3602 |
| | | | | 706/26 |
| 2006/0293818 | A1* | 12/2006 | Lu | B62D 15/0235 |
| | | | | 701/41 |

OTHER PUBLICATIONS

Parmar et al., "A Sensorless Optimal Control System for an Automotive Electric Power Assist Steering System", Apr. 2004, IEEE Publication, vol. 151, No. 2, pp. 290-298 (Year: 2004).*

* cited by examiner

*Primary Examiner* — Elias Desta
(74) *Attorney, Agent, or Firm* — Tarolli, Sundheim, Covell & Tummino LLP

(57) ABSTRACT

A method is proposed for processing a measurement signal, in particular for a steering system. The method comprises the following steps: A measured variable is acquired based on the measurement signal, wherein the measured variable comprises items of information about a physical variable, and wherein the measured variable is a superposition of the actual value of the physical variable and the measurement noise. Filter parameters of a filter are ascertained based on the measured variable and a mathematical model of the measurement noise. The measurement signal is filtered by means of the filter, whereby an estimated value of the physical variable is obtained, wherein the filter has the ascertained filter parameters. The filter parameters are ascertained in such a way that a deviation between the estimated value of the physical variable and the actual value of the physical variable is approximated and minimized. Furthermore, a control unit for a steering system, a steering system, a computer program, and a computer-readable data carrier are disclosed.

15 Claims, 2 Drawing Sheets

METHOD FOR PROCESSING A MEASUREMENT SIGNAL

RELATED APPLICATIONS

The present invention claims priority from 102020206053.3, filed 13 May 2020, the entirety of which is incorporated herein by reference.

BACKGROUND OF THE INVENTION

The invention relates to a method for processing a measurement signal. The invention furthermore relates to a control unit for a steering system of a motor vehicle, a steering system for a motor vehicle, a computer program, and a computer-readable data carrier.

Electro-mechanically assisted steering systems of motor vehicles are, expressed in general terms, designed to detect a torque on the steering wheel due to the driver and, based thereon, to provide a matching assistance torque via an electric motor, which assists the driver in steering the motor vehicle.

The steering system typically includes a sensor, which acquires a torque and/or a steering angle, for example, and converts the physical variable into an electrical signal (measurement signal) for further processing. Due to this measuring process, the measurement signal also contains undesired measurement noise in addition to the items of information about the physical variable (so-called useful signal component).

The measurement signal is used, for example, for the purpose of determining an assistance torque by a controller or a regulator. The assistance torque is then provided via the electric motor. According to typical methods, specific frequency components in the measurement signal are amplified in order to generate the assistance torque. However, in addition to a useful signal, measurement noise present in the measurement signal is also amplified simultaneously thereby, which can result in undesired noise formation in the steering system.

The measurement signal is therefore filtered in the prior art by means of a low-pass filter, bandpass filter, or similar filters having chronologically constant transmission behavior in order to reduce the undesired measurement noise. However, the steering feeling can be impaired by the filtering if the frequency range of the useful signal to be filtered and the measurement noise overlap. In addition, the measurement signal is used in the control loop, whereby the risk of worsening of the robustness and stability of the control loop exists with this type of filtering.

SUMMARY OF THE INVENTION

The object of the invention is therefore to provide an alternative method for processing a measurement signal, in which the measurement noise is reliably reduced over the entire frequency range without changing the frequency components of the useful signal.

The object is achieved according to the invention by a method for processing a measurement signal, in particular for a steering system. The method comprises the following steps: A measured variable is acquired based on the measurement signal, wherein the measured variable comprises items of information about a physical variable, and wherein the measured variable is a superposition of the actual value of the physical variable and the measurement noise. Filter parameters of a filter are ascertained based on the measured variable and a mathematical model of the measurement noise. The measurement signal is filtered by means of the filter, whereby an estimated value of the physical variable is obtained, wherein the filter has the ascertained filter parameters. The filter parameters are ascertained in such a way that a deviation between the estimated value of the physical variable and the actual value of the physical variable is approximated and minimized.

The physical variable is preferably a useful signal, in particular a useful signal of the steering system.

In contrast to the prior art, the measurement signal is not simply filtered by means of a filter having chronologically constant transmission behavior in order to reduce the measurement noise. Rather, according to the method according to the invention, a filter having time-variant filter parameters is used in order to filter the measurement signal.

The filter parameters of the filter are determined here in each data acquisition point so that all of the measurement noise is filtered out as much as possible, without also filtering out components of the actual value of the physical variable. For this purpose, the deviation between the estimated value of the physical variable and the actual value of the physical variable is minimized. In particular, a quadratic deviation between the estimated value of the physical variable and the actual value of the physical variable is minimized.

The filtering out of the measurement noise is enabled by the mathematical model of the noise characteristic, which permits the filter parameters to be deliberately adjusted to the measurement noise in each data acquisition step.

Accordingly, the measurement noise is filtered out over the entire relevant frequency range by the method according to the invention without changing the useful component. The stability and robustness properties of a control loop which uses the measurement signal are thus maintained. In the steering system, this furthermore means that the steering feeling remains unimpaired.

The filter is preferably a filter having finite impulse response. Such filters are also referred to in English as a "finite impulse response (FIR) filter". The advantage of such FIR filters is that they process the measurement signal particularly quickly, i.e., with low latency.

However, it would also be conceivable that a filter having infinite impulse response is used. Such filters are also referred to in English as an "infinite impulse response (IIR) filter".

One aspect of the invention provides that the physical variable is a steering column torque and/or that the measured variable is the measured value of a torque sensor. A "steering column torque" is to be understood here and hereinafter as a torque which acts in the steering column. The steering system can accordingly comprise a torque sensor, which is coupled to the steering column and is designed to measure the torque acting in the steering column.

Alternatively or additionally, the physical variable can be a steering angle and/or a steering angular velocity. The measured variable can accordingly be the measured value of a steering angle sensor.

At least one actuator of the steering system is preferably controlled based on estimated value of the physical variable. The actuator is therefore controlled based on a best-possible estimation of the actual value of the physical variable.

For example, an electric motor of the steering system is controlled based on the estimated value of the physical variable. In particular, the electric motor is an auxiliary motor of the steering system, which is designed to generate an assistance torque in order to assist the driver when steering the motor vehicle.

In a further embodiment of the invention, the measurement noise in the mathematical model is modeled as a Gaussian process. The measurement noise may be described sufficiently accurately here via the knowledge of the process mean value and the process auto-correlation.

According to a further embodiment of the invention, the measurement noise and the physical variable are uncorrelated in the mathematical model. This means that the cross-correlation between the physical variable and the measurement noise is equal to zero at an arbitrary point in time. The measurement noise may thus be decoupled from the physical variable in the mathematical model.

In a further embodiment of the invention, the measurement noise is modeled as white noise in the mathematical model. A spectral power density of the measurement noise is thus, at least in the relevant frequency range, essentially constant, in particular is constant. Furthermore, the measurement noise at one point in time is uncorrelated with the measurement noise at any other point in time.

A further aspect of the invention provides that the measurement noise is modeled in the mathematical model as time-independent or having a known chronological dependence. More precisely, characteristic static variables of the measurement noise are chronologically constant or the chronological dependence is known in the mathematical model. In particular, the mean value and/or the auto-correlation of the measurement noise are chronologically constant or the chronological change thereof is known.

The filter parameters are preferably determined recursively, in particular by means of a recursive method of least squares. In other words, the filter parameters are thus not determined again in each data acquisition step with the aid of stored data from prior data acquisition steps, but rather are recursively determined based on the prior filter parameters and the newly acquired data. Processing time and/or resources are thus saved.

In one embodiment of the invention, the measured value is only taken into consideration in a predefined time window to ascertain the filter parameters. Data points of the measured variable which are too far in the past are thus no longer considered. The filter parameters are thus adaptively adjusted, whereby a possibly existing time variance of the physical variable is taken into consideration.

The object is furthermore achieved according to the invention by a control unit for a steering system of a motor vehicle, wherein the control unit is designed to carry out an above-described method.

In particular, the physical variable is a steering column torque and/or the measured variable is the measured value of a torque sensor of the steering system.

Reference is made to the above explanations with respect to the method in regard to the advantages and properties of the control unit, which also apply to the control unit and vice versa.

The object is furthermore achieved according to the invention by a steering system of a motor vehicle. The steering system includes a sensor which is designed to acquire a measured variable which comprises items of information about a physical variable. Furthermore, the steering system comprises an above-described control unit.

In particular, the physical variable is a steering column torque and/or the measured variable is the measured value of a torque sensor of the steering system. The sensor can accordingly be designed as a torque sensor.

Reference is made to the above explanations with respect to the method in regard to the advantages and properties of the steering system, which also apply to the steering system and vice versa.

The object is furthermore achieved according to the invention by a computer program having program code means in order to carry out the steps of an above-described method when the computer program is executed on a computer or a corresponding processing unit, in particular a processing unit of an above-described control unit.

"Program code means" are to be understood here and hereinafter as computer-executable instructions in the form of program code and/or program code modules in compiled and/or in uncompiled form which can be provided in any programming language and/or in machine language.

Reference is made to the above explanations with respect to the method in regard to the advantages and properties of the computer program, which also apply to the computer program and vice versa.

The object is furthermore achieved according to the invention by a computer-readable data carrier, on which an above-described computer program is stored.

Reference is made to the above explanations with respect to the method in regard to the advantages and properties of the computer-readable data carrier, which also apply to the computer-readable data carrier and vice versa.

BRIEF DESCRIPTION OF THE DRAWINGS

Further advantages and properties of the invention result from the following description and the appended drawings, to which reference is made. In the figures.

DESCRIPTION

Figure 1:
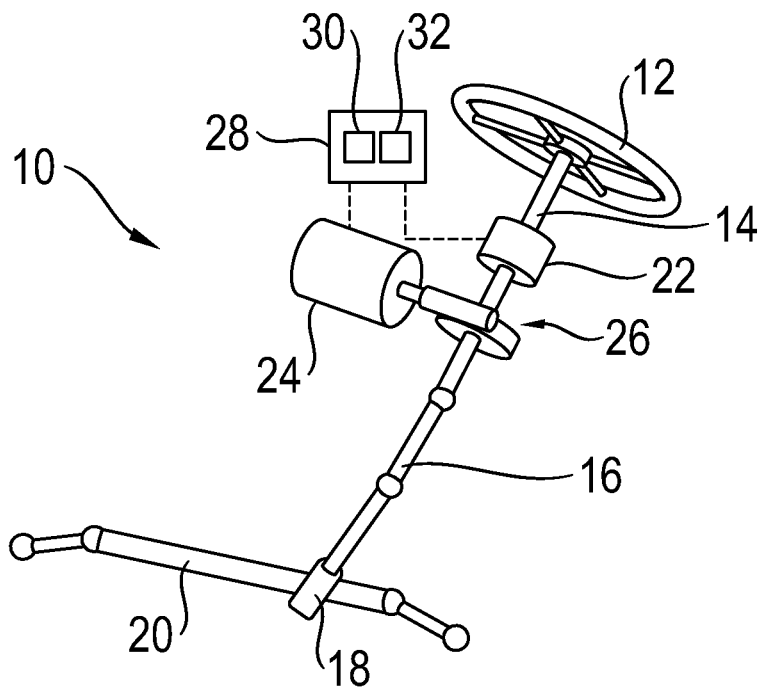
FIG. 1 schematically shows a steering system according to the invention.

FIG. 1 schematically shows a steering system 10 for a motor vehicle, wherein the steering system 10 is embodied as an electromechanically assisted steering system having steering column assistance (English: "column drive EPS").

The steering system 10 includes a steering wheel 12, which is connected via an upper part of a steering column 14 and via a steering intermediate shaft 16 to a pinion 18. The pinion 18 meshes with a toothed rack 20, so that a torque is applied to it when the driver rotates the steering wheel 12.

A torque and/or steering angle sensor 22 is arranged on the steering column 14, which is designed to measure steering torques and/or a steering angle. In particular, it is thus a steering torque and steering angle sensor, which is also referred to in English as a "torque and angle sensor (TAS)" and can provide a steering angle in addition to the steering torque.

Furthermore, an electric motor 24 is provided, which is connected via a gear 26 in a torque-transmitting manner to the steering intermediate shaft 16.

The gear 26 is designed in FIG. 1 as a worm gear. Alternatively, however, the gear 26 can be designed as a spur gear, as a bevel gear, or as any other suitable type of gear.

In any case, at least a torque which is provided by the electric motor 24 is transmitted via the gear 26 to the steering intermediate shaft 16 to execute a steering assistance.

The electric motor 24 and the torque and/or steering angle sensor 22 are each connected in a signal-transmitting manner, which is only schematically indicated in FIG. 1, to a control unit 28 of the steering system 10.

In general terms, the control unit 28 is designed, based on measurement data from the steering system 10, in particular based on measurement data of the torque and/or steering angle sensor 22, to ascertain a torque to be applied and to transmit corresponding control commands to the electric motor 24, so that the electric motor 24 provides the torque to be applied.

It is to be noted that the above-described steering system 10 having steering column assistance is only an example used for illustration. The following explanations also apply, possibly with minor modifications, to any other type of steering system, in particular to steering systems having a pinion drive (English: "single pinion drive EPS"), steering systems having dual pinion (English: "dual pinion drive EPS"), steering systems having concentric toothed rack drive via a recirculating ball nut, steering systems having a belt drive, and so-called steer-by-wire steering systems, in which there is no mechanical operational connection between the steering wheel 12 and the wheels of the motor vehicle.

In general terms, all various types of steering systems having electromechanical steering assistance share the feature that the control unit 28 detects a torque applied by the driver to the steering wheel 12 and controls the electric motor 24 based thereon in order to generate a specific assistance torque.

In this case, specific frequency components in the measurement signal are typically amplified in order to generate a specific steering feeling. However, measurement noise present in the measurement signal is thus also amplified simultaneously, which can result, for example, in undesired noise formation in the steering system 10.

The measurement noise is frequency dependent and can be characterized by means of the so-called signal-to-noise ratio (SNR). More precisely, the signal-to-noise ratio at a specific frequency $\omega$ may be characterized by a ratio of the spectral power densities of the actual physical variable $P_{phyVal}(\omega)$ and the spectral power density of the interference $P_{noise}(\omega)$, i.e., by $$SNR(\omega) = \frac{P_{phyVal}(\omega)}{P_{noise}(\omega)}.$$

Figure 2:
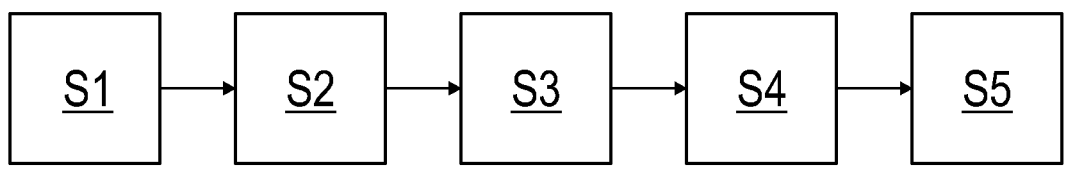
FIG. 2 schematically shows a flow chart of a method according to the invention for processing a measurement signal.

In order to reduce the measurement noise reliably over the entire relevant frequency range, the control unit 28 is designed to carry out the method steps explained in the following on the basis of FIGS. 2 and 3.

More precisely, the control unit 28 comprises a processing unit 30 and a data carrier 32, wherein a computer program is stored on the data carrier 32, which is executed on the processing unit 30 and comprises program code means in order to cause the steering system 10 to carry out the steps of the method explained hereinafter.

Firstly, a measurement signal is generated by means of the torque and/or steering angle sensor 22 (step S1). Depending on the embodiment of the torque and/or steering angle sensor 22, the measurement signal contains items of information about a torque which acts in the steering column 14, and/or items of information about an angle of rotation of the steering column 14.

The measurement signal is relayed to the control unit 28 and is further processed thereby. A measured variable is acquired by the control unit based on the measurement signal (step S2).

In the following, the case is explained as an example that the measured variable is a measured torque $T_{column,meas}$ acting in the steering column 14. Accordingly, the underlying physical variable is the actual torque $T_{column}$ acting in the steering column 14. The measured torque is in this case a superposition of the actual torque $T_{column}$ and the measurement noise $v_{meas}$, and the following thus applies $$T_{column,meas} = T_{column} + v_{meas}.$$

The measured variable $T_{column,meas}$ can be measured directly by the torque sensor 22. For example, the torque $T_{column,meas}$ acting in the steering column 14 is determined from a torsion angle of a torsion bar of the steering column 14.

Filter parameters $\underline{p}$ of a filter are now ascertained based on the measured torque $T_{column,meas}$ and a mathematical model of the measurement noise $v_{meas}$ (step S3).

The filter in the exemplary embodiment described hereinafter is a filter having finite impulse response.

However, it would also be conceivable that a filter having infinite impulse response is used.

Here and in the following, vector-valued variables are identified by an underline.

In general terms, upon the filtering of the measured torque $T_{column,meas}$ by means of the filter, an estimated value $\tilde{T}_{column}$ of the physical variable $T_{column}$ is obtained.

Accordingly, in step S3, the filter parameters $\underline{p}$ are determined in such a way that a deviation between the estimated value $\tilde{T}_{column}$ and the physical variable $T_{column}$ is as small as possible, as explained in greater detail hereinafter.

At least one, in particular all of the following assumptions underlie the mathematical model:

The measurement noise can be described sufficiently accurately by a Gaussian process. That is to say, the knowledge about the process mean value and the auto-correlation function of the process are sufficient to characterize the measurement noise.

The actual value of the physical variable $T_{column}$ and the measurement noise $v_{meas}$ are uncorrelated, i.e., the cross-correlation function $E\{T_{column} v_{meas}\}$ is equal to zero.

Characteristic statistical variables of the measurement noise are chronologically constant or their chronological dependence is known. In particular, the mean value and/or the auto-correlation function of the measurement noise is chronologically constant or its chronological dependence is known.

The actual value of the physical variable $T_{column}$ is time variant and can thus change with the time. In particular, the spectral power density of the physical variable $T_{column}$ is also time variant.

Figure 3:
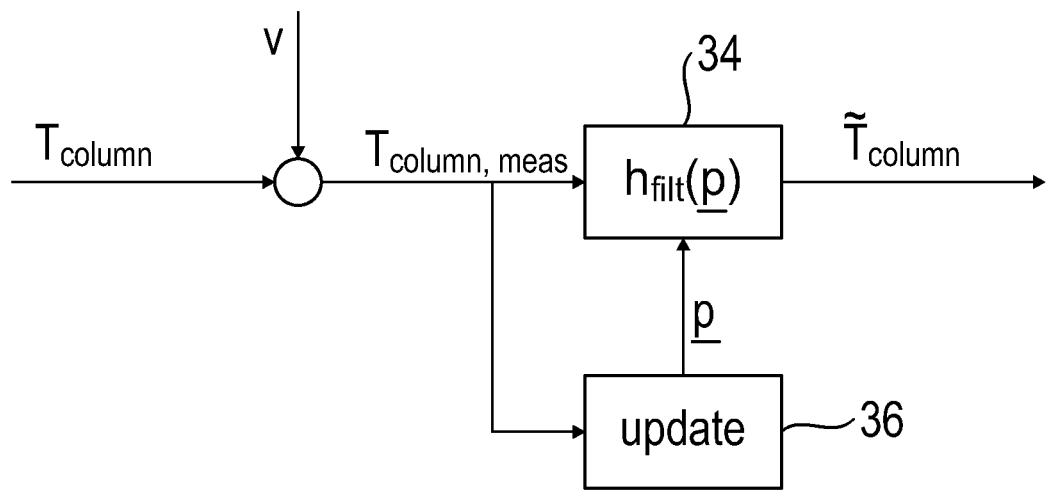
FIG. 3 shows an illustration of the functionality of a computer program according to the invention.

The functionality of the computer program is illustrated in greater detail in FIG. 3, more precisely the ascertainment of the filter parameters. As can be seen therein, the computer program includes a filter module 34 and an update module 36.

The update module 36 receives the measured variable $T_{column,meas}$ and ascertains, based on the mathematical model of the measurement noise $v_{meas}$, updated filter parameters $\underline{p}$ for the filter module 34.

The filter module 34 consists of the above-described filter having the impulse response $h_{filt}(\underline{p})$ dependent on the n parameters in the filter parameter vector $\underline{p}$, wherein n is a natural number greater than zero. The time response y(t) at the point in time t≥0 of the filter to the excitation with the measured variable $T_{column,meas}$ is given via convolution $$y(t) = h_{filt}(\underline{p}) * T_{column,meas}$$

This describes the filtering of the measured variable via the filter module 34.

By way of the filtering of the measured variable $T_{column,meas}$ using the filter module 34, more precisely using the filter, the estimated value $\tilde{T}_{column}$ of the physical variable $T_{column}$ is obtained if the adjusted filter parameters $\underline{p}$ from the update module 36 are used in the filter module 34. This means that for this purpose the general time response of the filter y(t) corresponds to the estimated value of the physical variable $\tilde{T}_{column}$.

The filter parameters $\underline{p}^T = [p_0, p_1, \ldots, p_{n-1}]$ of the filter are adjusted by the update module 36 in each data acquisition step.

The adjustment of the filter parameters $\underline{p}$, takes place in that a set of filter parameters $\underline{p}$ is ascertained which minimizes the quality function $$J = E\{(\tilde{T}_{column} - T_{column})^2\} = E\{(h_{filt}(\underline{p}) * T_{column,meas} - T_{column})^2\}$$

which is dependent on a deviation between the estimated value $\tilde{T}_{column}$ and the physical variable $T_{column}$.

The variance of the error between the estimated value $\tilde{T}_{column}$ and the physical variable $T_{column}$ is used as the quality function J.

The quality function J can be understood as a function of the filter parameters $\underline{p}$, it is thus $J = J(p_0, p_1, \ldots, p_n)$. The filter parameters $\underline{p}$ are determined so that the quality function J assumes a minimum.

For this purpose, the equation $$\frac{d}{d\underline{p}} J = \underline{0}$$

is solved and generally supplies as a condition for the minimum of the quality function J $$\frac{dJ}{d\underline{p}} = \frac{d}{d\underline{p}} E\{(h_{filt}(\underline{p}) * T_{column,meas} - T_{column})^2\} =$$

$$E\left\{2(h_{filt}(\underline{p}) * T_{column,meas} - T_{column}) \cdot \frac{d}{d\underline{p}}(h_{filt}(\underline{p}) * T_{column,meas})\right\}.$$

One possibility for implementation is represented by the use of a filter having finite impulse response. The time response of the filter at an arbitrary sampling point in time $t_k$ of the processing unit 30 may then be specified by $$\tilde{T}_{column}(t_k) = h_{filt}(\underline{p}) * T_{column,meas} = \underline{p}^T \cdot \underline{T}_{column,meas}(t_k)$$

The vector $\underline{T}_{column,meas}$ is given here by $$\underline{T}_{column,meas}(t_k) = \begin{bmatrix} T_{column,meas}(t_k) \\ T_{column,meas}(t_{k-1}) \\ T_{column,meas}(t_{k-2}) \\ \vdots \\ T_{column,meas}(t_{k-n+1}) \end{bmatrix}$$

where $t_{k-m} - t_{k-m-1} = t_s$ and $t_{k-m} := t_k - m \cdot t_s$, wherein $t_s$ represents the sampling time of the processing unit 30 and m is a natural number greater than or equal to zero.

The solution to the equation $$\frac{d}{d\underline{p}} J = \underline{0}$$

supplies, upon use of a titter having finite impulse response $$-2E\{\underline{T}_{column,meas} T_{column}\}^{-1} \cdot E\{\underline{T}_{column,meas} \underline{T}^T_{column,meas}\}\underline{p} = 0$$

The set of filter parameters $\underline{p}$, which fulfills this condition is give by $$\underline{p} = E\{\underline{T}_{column,meas} \underline{T}^T_{column,meas}\}^{-1} E\{\underline{T}_{column,meas} T_{column}\}.$$

The filter parameters $\underline{p}$ are also dependent on the actual value $T_{column}$, which is not known by way of measurements. If it is presumed that the physical variable $T_{column}$ and the measurement noise $v_{meas}$ are uncorrelated, it then follows for the cross-correlation function $$E\{\underline{T}_{column,meas} T_{column}\} = E\{\underline{T}_{column,meas} T_{column,meas}\} - E\{\underline{v}v\}.$$

In contrast, the auto-correlation function $E\{\underline{v}v\}$ of the measurement noise is known on the basis of the assumptions i), ii), and iii), so that the set of filter parameters $\underline{p}$, which minimizes the quality function J, can be determined with $$\underline{p} = E\{\underline{T}_{column,meas} \underline{T}^T_{column,meas}\}^{-1} (E\{\underline{T}_{column,meas} T_{column,meas}\} - E\{\underline{v}v\}).$$

Alternatively, this can be expressed by the auto-correlation matrix $R_{TT}$ of the measured variable $T_{column,meas}$ and the auto-correlation $r_{TT}$ and $r_{vv}$ of the measured variable $T_{column,meas}$ or of the noise v, respectively, specifically as $$\underline{p} = \underline{R}^{-1}_{TT}(\underline{r}_{TT} - \underline{r}_{vv}) = \underline{R}^{-1}_{TT}\underline{r}_{TT} - \underbrace{\underline{R}^{-1}_{TT}\underline{r}_{vv}}_{adjustment}.$$

The first term $\underline{R}^{-1}_{TT}\underline{r}_{TT}$ corresponds to a solution in the absence of noise, while the second term $\underline{R}^{-1}_{TT}\underline{r}_{vv}$ represents an adjustment of the solution due to additive noise.

Preferably, the filter parameters $\underline{p}$ are not determined again using the above equation in each time step from previously stored measurement signal data. Rather, the filter parameters are calculated recursively according to the above equation, in particular by means of a recursive method of least squares. This means that a new set of filter parameters is determined from the filter parameters ascertained in the previous time step and a current value of the measured variable.

Optionally, in the above-described method, the measured variable can only be taken into consideration within a predefined time window, so that data points of the measured variable which are too far in the past are no longer taken into consideration. The filter is thus adaptively adjusted, whereby the time variance of the physical variable is taken into consideration.

After the filter parameters have been adjusted by means of the above-described method, the measurement signal is filtered by means of the filter, whereby the estimated value $\tilde{T}_{column}$ having the minimal deviation from the actual value $T_{column}$ is obtained (step S4).

Based on the estimated value $\tilde{T}_{column}$, at least one actuator of the steering system 10 is controlled (step S5). In particular, the electric motor 24 is controlled based on the estimated value $\tilde{T}_{column}$.

The invention claimed is:

1. A method for processing a measurement signal for a steering system, having the following steps:
   acquiring a measured variable based on the measurement signal, wherein the measured variable is a superposition of a physical variable and a measurement noise;
   ascertaining filter parameters of a filter based on the measured variable and a mathematical model of the measurement noise;
   filtering the measurement signal with the filter having the ascertained filter parameters, whereby an estimated value of the physical variable is obtained;
   determining an assistance torque to be applied to the steering system based on the estimated value; and
   applying the assistance torque to the steering system;
   wherein the filter parameters are ascertained in such a way that a deviation between the estimated value of the physical variable and the physical variable is approximated and minimized.

2. The method as claimed in claim 1, wherein the filter is a filter having finite impulse response.

3. The method as claimed in claim 1, wherein the physical variable is a steering column torque and/or the measured variable is provided by a torque sensor.

4. The method as claimed in claim 3, wherein at least one actuator of the steering system is controlled based on the estimated value of the physical variable.

5. The method as claimed in claim 1, wherein the measurement noise is modeled in the mathematical model as a Gaussian process.

6. The method as claimed in claim 1, wherein the measurement noise and the physical variable are uncorrelated in the mathematical model.

7. The method as claimed in claim 1, wherein the measurement noise is modeled in the mathematical model as time-independent or having a known chronological dependence.

8. The method as claimed in claim 1, wherein the filter parameters are recursively determined by a recursive method of least squares.

9. The method as claimed in claim 1, wherein the measured variable is only taken into consideration in a predefined time window to ascertain the filter parameters.

10. A control unit for a steering system of a motor vehicle, wherein the control unit is configured to carry out a method as claimed in claim 1.

11. A steering system of a motor vehicle, having a sensor, which is designed to acquire the measured variable and a control unit as claimed in claim 10.

12. A computer program encoded in a non-transitory computer-readable data carrier having program code to carry out the method as claimed in claim 1 when the computer program is executed on a computer or a corresponding processing unit of a control unit for a steering system of a motor vehicle.

13. The non-transitory computer-readable data carrier, on which a computer program as claimed in claim 12 is stored.

14. The method as claimed in claim 1, wherein the step of applying an assistance torque to the steering system includes actuating an electric motor of the steering system to apply the assistance torque.

15. The steering system as claimed in claim 11 wherein the sensor is configured to acquire at least one of a steering torque and a steering angle applied to a steering wheel of the steering system, the control unit causing an electric motor to apply the assistance torque to the steering system.

* * * * *